(12) United States Patent
Mishra et al.

(10) Patent No.: US 10,417,541 B1
(45) Date of Patent: Sep. 17, 2019

(54) REFLECTED LIGHT IDENTIFICATION (RLID) DEVICE

(71) Applicant: Amazon Technologies, Inc., Seattle, WA (US)

(72) Inventors: Pragyana K. Mishra, Seattle, WA (US); Dushyant Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 15/387,220

(22) Filed: Dec. 21, 2016

(51) Int. Cl.
  *G06K 7/10* (2006.01)
  *G06K 19/06* (2006.01)
  *G06K 7/14* (2006.01)

(52) U.S. Cl.
  CPC ..... *G06K 19/06046* (2013.01); *G06K 7/1408* (2013.01)

(58) Field of Classification Search
  CPC . G06K 7/10; G06K 7/14; G08C 21/00; G06F 17/00; G02B 26/00; G02F 1/00; G01J 1/32
  USPC ............................. 235/455, 454, 462.06, 375
  See application file for complete search history.

(56) References Cited

U.S. PATENT DOCUMENTS

| | | | | |
|---|---|---|---|---|
| 5,841,121 A * | 11/1998 | Koenck | ............... | G06K 7/10574 235/472.01 |
| 6,164,540 A * | 12/2000 | Bridgelall | .......... | G06K 7/10851 235/455 |
| 2005/0001036 A1 * | 1/2005 | Blake | ................. | G06K 7/10574 235/462.37 |
| 2005/0146707 A1 * | 7/2005 | Wada | ...................... | G01P 3/366 356/28 |
| 2006/0118627 A1 * | 6/2006 | Joseph | ............... | G06K 7/10732 235/454 |
| 2007/0098407 A1 * | 5/2007 | Hebrank | ................ | G08C 23/04 398/106 |
| 2007/0165233 A1 | 7/2007 | Freeling | | |

OTHER PUBLICATIONS

Office Action for U.S. Appl. No. 15/387,275, Mishra, "Active Reflected Light Identification (RLID) Device", 7 pages.

* cited by examiner

*Primary Examiner* — Daniel St Cyr
(74) *Attorney, Agent, or Firm* — Lee & Hayes, P.C.

(57) ABSTRACT

A reflected light identification (RLID) system uses light to communicate stored information across long distances with minimal interference. The RLID system may include a light source that directs an incident light signal to an RLID structure, which then transmits an encoded light signal to a sensor. The RLID system may include a passive RLID structure (i.e., a structure that does not include power source) such as an RLID reflection surface that includes layered reflective films that reflect the incident light signal back in multiple reflections that serially encodes data. The RLID system may also include an active RLID structure (i.e., a structure that includes power source) that uses energy harvesting to extract and accumulate power from an incident light signal, and then uses the harvested energy to transmit a return signal.

20 Claims, 12 Drawing Sheets

REFLECTED LIGHT IDENTIFICATION (RLID) DEVICE

BACKGROUND

Radio Frequency Identification (RFID) systems are currently used to wirelessly communicate information without a power connection. These RFID systems use RFID tags that may be integrated into products/packaging, key chains, currency, clothing, livestock, or just about any object that needs to be identified or tracked. RFID tags contain electronically-stored information, and are configured to automatically generate a radio wave signal to wirelessly transmit the stored information when prompted or activated by an incoming radio signal. However, because radio transmissions tend to interfere with one another, it is difficult to read multiple RFID tags simultaneously. Additionally, RFID tags are only able to transmit information over a limited range, with passive RFID tags (i.e., RFID tags with no power source) being able to transmit up to 20 feet. Additionally, while some active RFID tags (i.e., RFID tags with a connected battery) are able to transmit information up to 100 yards, such active RFID tags can be prohibitively expensive and require effort to keep batteries charged. Accordingly, it is desired to have an alternative to RFID technology that is low cost, requires little or no maintenance, and which is also able to transmit over long distances with minimal potential for interferences.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
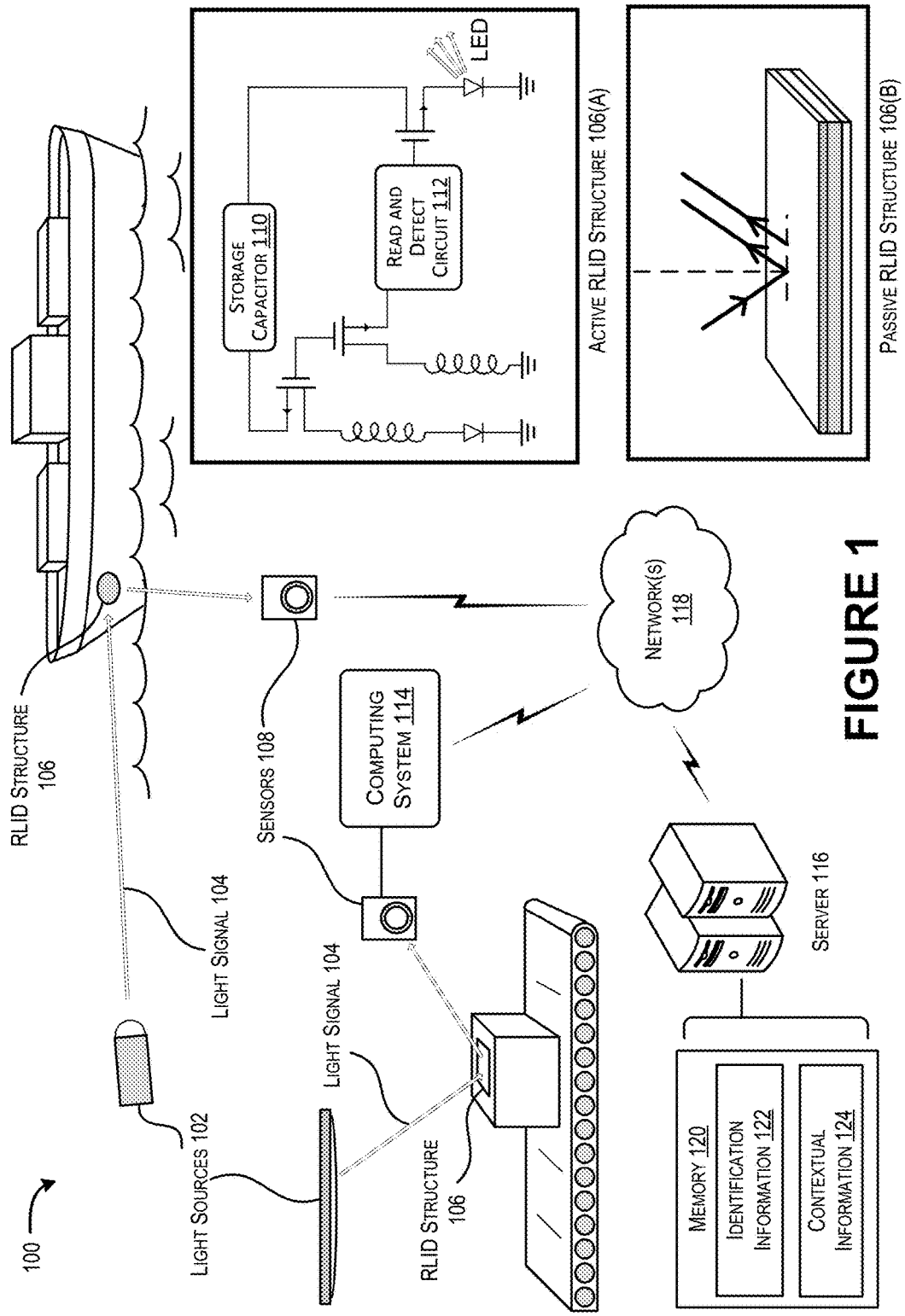
FIG. 1 is a schematic diagram of an illustrative environment for utilizing reflected light identification (RLID) structures.

This disclosure is generally directed to a reflected light identification (RLID) system that uses light, instead of electromagnetic signals in the radio frequency range, to communicate stored information across long distances with minimal interference. The RLID system may include a light source that directs light to an RLID structure (or device). Upon reception of the light, the RLID structure then transmits an encoded light signal to a sensor. In some embodiments the light source may be a laser, light-emitting diode (LED), flashlight, headlight, and/or other source that transmits one or more of a directed light signal or scattered light signal. Alternatively, the light source can be an environmental light source that provides ambient light.

In some embodiments, the RLID structure may include a passive RLID structure (i.e., a structure that does not include a power source) such as an RLID reflection surface. An RLID reflection surface may include layered reflective films that reflect a beam of light back in multiple reflections that serially encodes data. For example, as the light from the light source strikes individual reflective film layers of the RLID reflection surface, the incident light is split into a first portion that is reflected and a second portion that is refracted. In this way, an RLID reflection surface having multiple reflective film layers splits a beam of incident light into multiple reflected beams that exhibit particular characteristics, such as a polarization pattern, a frequency shift pattern, a beam spread pattern, a pulse spacing pattern, a pulse width pattern, or a combination thereof.

By controlling the thickness and/or refractive indices of the reflective film layers within an RLID reflection surface, an RLID reflection surface may be built to reflect light having one or more known reflective signatures (i.e., known characteristics that light reflected off the RLID exhibits). For example, a reflective signature of an RLID may be a known spread pattern, temporal spacing, frequency variation, or a combination thereof that light reflected off the RLID reflection surface exhibits. In some embodiments, an RLID reflection surface may be able to change its reflective signature by adjusting the thickness and/or an index of refraction of one or more of its component reflective film layers. For example, an RLID reflection surface may include a capacitor, that when charged creates an electromagnetic field that adjusts a refractive index of a reflective film layer, thus changing the characteristics of light reflected off the RLID reflection surface. In other example, exposure to one or more chemical compounds may cause the thickness and/or index of refraction of one or more reflective film layers to change.

In other embodiments, the RLID structure may include an active RLID structure (i.e., a structure that includes a power source). An active RLID structure uses energy harvesting to extract and accumulate power from an incoming beam of light, and then uses the harvested power to transmit a signal. For example, an active RLID structure may harvest energy from an incident light beam via a photodiode, and use the energy to cause an LED to emit a light beam that encodes a piece of data (i.e., exhibits particular characteristics such as frequency, pulse length, pulse pattern, etc.). In another example, the active RLID structure may use the energy to actuate a micro-mirror to reflect a remaining part of the incident light beam. By vibrating the micro-mirror in a particular pattern, the active RLID structure may transmit coded information with the reflected light. In some embodiments, the energy that is harvested by the photodiode may be routed to a capacitor or battery that temporarily stores the energy.

In some embodiments, the active RLID structure may include a read circuit that is configured to trigger the active RLID structure to transmit the signal in response to a determination that the incident light exhibits a particular characteristic. For example, the read circuit may only trigger the capacitor to discharge its energy to transmit the signal when the incoming light absorbed by the photodiode has a particular pulse pattern.

The RLID system may also include one or more sensors that detect the signal reflected or emitted from the RLID structure. For example, a sensor may be able to determine the reflection signature of an RLID reflective surface. In another example, the sensor may be able to determine the characteristics of a signal emitted by an active RLID structure. In some embodiments, the sensors may operate in conjunction with the light source. For example, the light source may operate in a first stage in which the light source emits a light pulse into an environment, then after the sensor receives a reflection and/or signal from an RLID structure, the light source may operate in a second stage in which the light source emits a targeted beam of light to the RLID structure.

Once the sensor determines the characteristics of the signal reflected or emitted from the RLID structure, the RLID system may make one or more determinations based on the characteristics. For example, in an embodiment where the sensor is associated with a vehicle, in response to a sensor receiving a reflection signature from an RLID reflective surface, the RLID system may determine that the reflection signature corresponds to a "stop sign." The RLID system can then notify the vehicle and/or a driver that the vehicle is approaching a stop sign. Because light propagates over long distances, such an RLID system may allow vehicles to identify upcoming signage over distances of a half mile or more without requiring an energy source. In another embodiment, the RLID system may use the characteristics of the signal to determine the identity of and/or information about an object associated with the RLID structure. For example, where an RLID reflective surface is located on one or more sides of a package, the RLID system may determine information about the package based upon the reflection signature of the RLID reflective surface. Such an RLID could be incorporated into a package label, might cover an entire side of a package, be incorporated into the adhesive tape used to secure the package, or a combination thereof.

The techniques, apparatuses, and systems described herein may be implemented in a number of ways. Example implementations are provided below with reference to the following figures.

FIG. 1 is a schematic diagram of an illustrative environment 100 for utilizing RLID structures. The environment 100 includes light sources 102 from which a light signal 104 may originate, a reflected light identification (RLID) structure 106 to reflect the light signal, and sensors 108 that detect the reflected light signal.

The light sources 102 may include a laser, light-emitting diode (LED), flashlight, headlight, an ambient light source, another source that transmits light, or a combination thereof. For example, light source 102 may be a vehicle headlight that emits a beam of directed light onto the path of the vehicle. In another example, the light source 102 can be an ambient light source such as a streetlight, sunlight, or other ambient light source. The light signal 104 may include one or more of a directed light signal or a scattered light signal.

The light signal 104 may illuminate or shine on a surface of an RLID structure 106. The RLID structure 106 may be an active RLID structure 106(A) or a passive RLID structure 106(B). The active RLID structure 106(A) may include a connection to a power source, a battery, a storage capacitor 110, or a combination thereof. In some embodiments, the active RLID structure 106(A) harvests energy from incident light signal 104, and then uses the harvested energy to transmit a signal. For example, an active RLID structure 106(A) may harvest energy from an incident light signal 104 via a photodiode, and use the energy to cause an LED to emit a light beam that encodes a piece of data (i.e., exhibits particular characteristics such as frequency, pulse length, pulse pattern, etc.). In another example, the active RLID structure 106(A) may use the energy to actuate a micro-mirror to reflect a remaining part of the incident light signal 104. By vibrating the micro-mirror in a particular pattern, the active RLID structure 106(A) may transmit coded information with the reflected light.

In some embodiments, the active RLID structure 106(A) may include a read and detect circuit 112 that is configured to trigger the active RLID structure 106(A) to transmit the signal in response to a determination that the incident light signal 104 exhibits a particular characteristic. For example, the read and detect circuit 112 may only trigger the active RLID structure 106(A) to transmit a signal when the incoming light signal 104 has a particular pulse pattern.

The passive RLID structure 106(B) may be a structure that does not include a power source, such as an RLID reflection surface. For example, the passive RLID structure 106(B) may include layered reflective films that reflect and refract the light signal 104 in a way that separates the incident light signal 104 into multiple reflected portions that have particular characteristics, such as a frequency shift pattern, a beam spread pattern, a pulse width pattern, or a combination thereof. Because the layered reflective films reflect and refract the incident light signal 104 according to Snell's Law and Fresnel's Equations, by controlling (or selecting) the thickness and/or refractive indices of the reflective film layers, the passive RLID structure 106(B) can be built such that light that is reflected off the passive RLID structure 106(B) has particular characteristics.

In some embodiments, one or more of the thickness and index of refraction of one or more reflective film layers of the passive RLID structure 106(B) may change based on environmental conditions (e.g., temperature, humidity, air pressure, etc.). Because the change in the thickness/index of refraction according to the environmental conditions would change the reflective signature of the passive RLID structure 106(B), a sensor may be able to determine environmental conditions of the passive RLID structure 106(B) based on the reflective signature of the reflected light. In other embodiments, the passive RLID structure 106(B) may be able to change its reflective signature by adjusting one or more of the thickness and index of refraction of one or more of its reflective film layers. For example, the passive RLID 106(B) may include a component that adjusts the temperature of the passive RLID 106(B). In another example, the passive RLID 106(B) may include a capacitor that changes the characteristics of one or more reflective film layers based upon the charge held by the capacitor.

Sensor(s) 108 may include one or more sensors that detect the signal reflected or emitted from the RLID structure 106. For example, a sensor may be able to detect characteristics of the signal, such as frequency, pulse length, pulse pattern, beam spread, or a combination thereof. In another example, the sensor may be able to determine the characteristics of a signal emitted by an active RLID structure 106(A). In some embodiments, the sensors 108 may operate in conjunction with the light source 102. For example, the light source 102 may operate in a first stage in which the light source 102 emits a light pulse into an environment, then after the sensor receives a reflection and/or signal from an RLID structure, the light source 102 may operate in a second stage in which the light source emits a targeted beam of light to the RLID structure.

In some embodiments, sensor 108 may be connected and/or integrated with a computing system 114. The computing system 114 may determine information encoded in the signal detected by sensor 108. For example, based on the characteristics of the detected signal, the computing system 114 may determine an identity of the RLID structure 106, determine information about an item associated with the RLID structure 106 (e.g., weight of a package, a destination for the package, a vehicle identification number, etc.), information about an environment of the RLID structure 106 (e.g., temperature, air pressure, traffic conditions, traffic signal status, etc.), or a combination thereof.

In some embodiments one or more of the sensor 108 and computing system 114 may be in communication with a server 116 via a network 118 such as, for example, the Internet or a local wireless network. The server 116 may be implemented or hosted by one or more servers, server farms, data centers, or other computing devices. The server 116 may include a memory 120 that may store one or more of identification information 122 and contextual information 124. Identification information 122 may include mappings between various signal characteristics and an identity of a particular RLID structure 106. Contextual information 124 may include information associated with the particular RLID structure 106.

Figure 2:
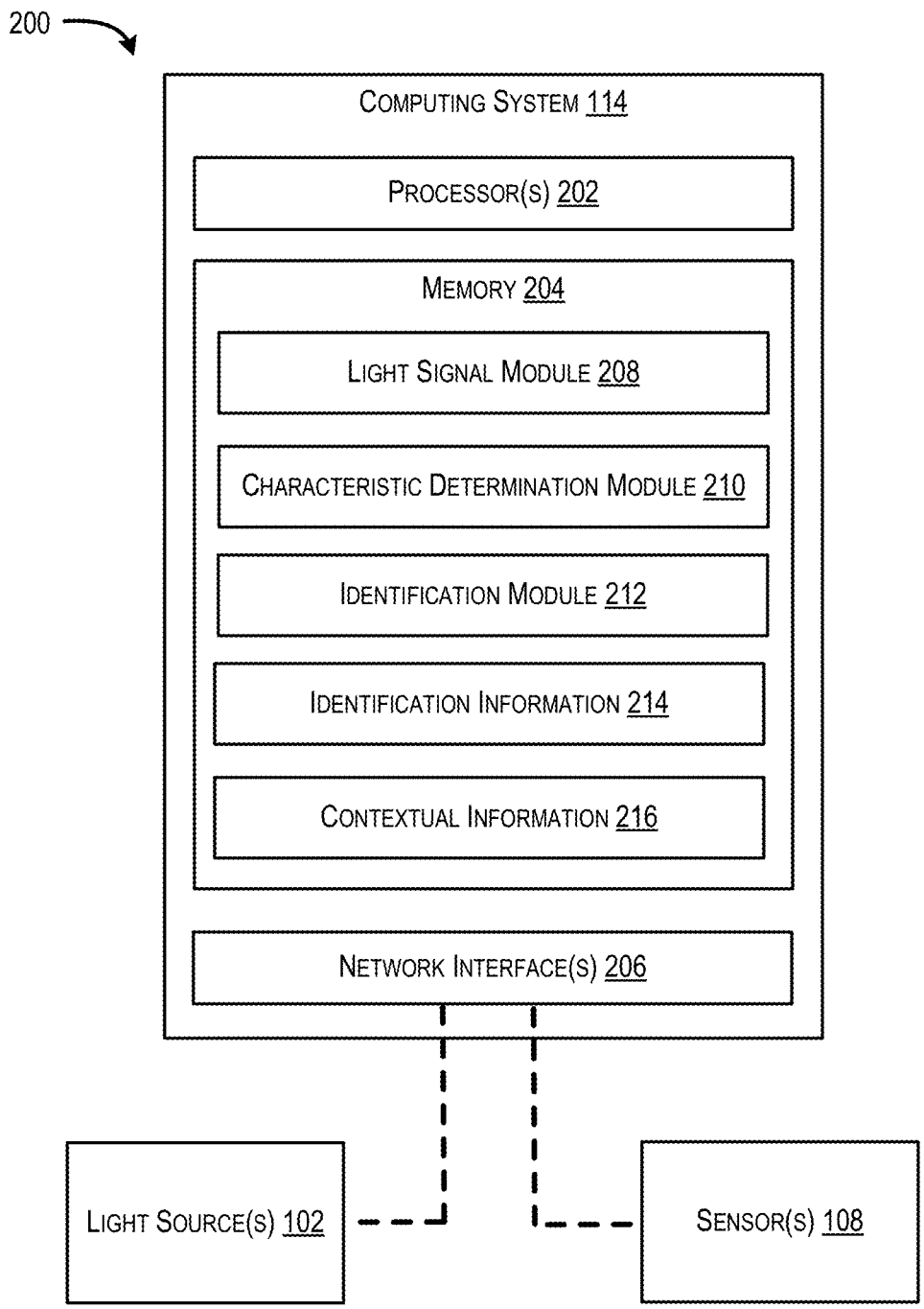
FIG. 2 is a block diagram of an illustrative computing architecture of the computing system shown in FIG. 1.

FIG. 2 is a block diagram of an illustrative computing architecture 200 of the computing system 114. The computing architecture 200 may be used to implement the various systems, devices, and techniques discussed above. In the illustrated implementation, the computing architecture 200 includes one or more processors 202 coupled to a memory 204. The computing architecture 200 may also include a network interface 206. The network interface 206 may include physical and/or logical interfaces for connecting the respective computing system 114 to one or more of light sources 102, sensors 108, networks 118, servers 116, etc. For example, the network interface 206 may enable WiFi-based communication such as via frequencies defined by the IEEE 802.11 standards, short range wireless frequencies such as Bluetooth®, or any suitable wired or wireless communications protocol that enables the respective computing device to interface with other computing devices.

FIG. 2 illustrates light source 102 and sensor 108 as being separate from computing system 114. However, those skilled in the art will also appreciate that according to the invention one or more of the light sources 102 and sensor 108 may be incorporated as components of computing system 114.

The computing system 114 can include a light signal module 208, a characteristic determination module 210, and an identification module 212 stored in the memory 204. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other instances, any or all of the modules can be implemented in whole or in part by hardware (e.g., a specialized processing unit, etc.) to execute the described functions. In various implementations, the modules described herein in association with the computing system 114 can be executed across multiple devices.

In various examples, memory 204 can further store identification information 214 and contextual information 216. Identification information 214 can be a collection of data that relates one or more light signal characteristics with information associated with one or more RLID structures. For example, the identification information 214 may identify a first set of light signal characteristics as being associated with a traffic stop sign, and a second set of light signal characteristics as being associated with a shipping container. The contextual information 216 can be a collection data relating information to one or more of the light signal characteristics and the identity of an RLID structure. For example, the contextual information 216 may correlate a particular shipping container identifier with shipping information for the shipping container (e.g., weight, contents, travel status, destination, etc.). Alternatively or in addition, the contextual information 216 may also identify environmental information associated with an RLID structure based on light signal characteristics, such as temperature, air pressure, traffic congestion, traffic signal status, etc.

The light signal module 208 can be executable by the one or more processors 202 to cause the light source 102 to transmit a light signal. For example, the light signal module 208 may cause the computing system 114 to transmit a wired or wireless signal to the light source via the network interface. The light signal module 208 may also cause the light source 102 to modulate the light signal so that it exhibits particular characteristics (certain frequency, a variation of frequency, a pattern of pulses, amplitude variation, or a combination thereof).

In this way, by modifying the characteristics of the light signal transmitted by the light source 102, the light signal module may cause information to be encoded within the light signal.

In some embodiments, the light signal module 208 may determine the characteristics of the light signal based on a purpose for sending the light signal, an identity of the computing system 114, the identity of an object associated with the computing system 114, etc. For example, where the computing system 114 is attempting to acquire traffic information, the computing system 114 may cause the light source 102 to transmit a light signal having a first set of characteristics (such as a particular wavelength) that traffic signal RLID structures are known to respond to. For example, a passive traffic signal RLID structure may be designed such that the refraction index and thickness of its component reflection films cause negative interference that eliminates or limits any reflections produced by the RLID structure unless the incident light exhibits the first set of characteristics. In another example, the reflective signature of the light reflected by a RLID structure may change dependent on the characteristics of light incident to the RLID structure. For example, the RLID structure may reflect light having a first reflective signature when the incident light exhibits a first set of characteristics (e.g., pulse pattern, pulse length pattern, wavelength(s), polarization pattern, frequency pattern, a combination thereof, etc.), and reflect light having a second reflective signature when the incident light exhibits a second set of characteristics. Accordingly, in some embodiments the light signal module 108 may cause the light source to operate in a first state where it transmits incident light having a first set of characteristics associated with traffic speed limits to acquire a reflective signature that corresponds to speed limit. The light signal module 108 may then cause the light source to operate in a second state where it transmits incident light having a second set of characteristics associated with weather conditions to acquire a reflective signature that corresponds to a temperature value.

In another example, the computing system 114 may cause the light source 102 to transmit a light signal having a second set of characteristics that are associated with a type of vehicle. An RLID structure that receives the light signal may determine whether to respond based on the second set of characteristics. In this way, the RLID structure may only respond in instances where it has relevant information for the type of vehicle.

The light signal module 208 may also cause the light source 102 to operate in multiple stages. For example, in an embodiment the light signal module 208 may cause the light source 102 to transmit a steady light signal while operating in a first stage, and transmit a light signal having a set of one or more characteristics while operating in a second stage. Alternatively or in addition, the light signal module 208 may cause the light source 102 to transmit a diffuse light signal while operating in a first stage, and transmit a directed light signal while operating in a second stage.

The characteristics module 210 can be executable by the one or more processors 202 to analyze to the reflected light detected by the sensor, and to determine characteristics of the reflected light. For example, characteristics of the reflected light that may be identified by the characteristics module 210 may include a frequency shift pattern, a beam spread pattern, a pulse width pattern, or a combination thereof. In some embodiments, determining the characteristics of the reflected light may include the characteristics module 210 determining a first set of characteristics of ambient light in the environment, and then comparing the first set of characteristics to a reflected light. By detecting differences between the first set of characteristics and the reflected light, the characteristics module 210 may determine the characteristics of the reflected light. As conditions within the environment change, the characteristics module 210 may periodically re-determine the first set of characteristics to reflect current ambient light conditions.

The identification module 212 can be executable by the one or more processors 202 to determine information based on the characteristics of the reflected light. For example, identification module 212 may determine that the characteristics exhibited by the reflected light correspond to a traffic signal of "STOP." In some embodiments, the identification module may determine the information based on one or more of identification information 214 and contextual information 216. For example, the identification module 212 may utilize identification information 214 to identify one or more RLID structures (or one or more objects associated with the RLID structures) that have been associated with the characteristics exhibited by the reflected light. For example, the identification information 214 may identify characteristics exhibited by the reflected light as being associated with a particular shipping container. The identification module 212 may then use contextual information 216 to determine information about the particular shipping container such as a destination of the container, shipping instructions for the container, contents of the container, a status of the container, etc.

Once the identification module 212 has determined the information, the identification module 212 can take one or more actions. For example, where the computing system 114 is associated with a vehicle and the information associated with the reflective signature corresponds to a traffic signal of "STOP," the computing system 114 may transmit a notification to a vehicle operation system that causes the vehicle to begin to initiate a stopping protocol.

Those skilled in the art will appreciate that the computing architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The computing architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

The one or more processing unit(s) 202 may be configured to execute instructions, applications, or programs stored in the memory 204. In some examples, the one or more processing unit(s) 202 may include hardware processors that include, without limitation, a hardware central processing unit (CPU), a graphics processing unit (GPU), and so on. While in many instances the techniques are described herein as being performed by the one or more processing units 202, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memory 204 is an example of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device. In general, computer storage media may include computer-executable instructions that, when executed by one or more processing units, cause various functions and/or operations described herein to be performed. In contrast, communication media embodies computer-readable instructions, data structures, program modules, or other data in a modulated data signal, such as a carrier wave, or other transmission mechanism. As defined herein, computer storage media does not include communication media.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computing architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the computing architecture 200 may be transmitted to the computing architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium.

The architectures, systems, and individual elements described herein may include many other logical, programmatic, and physical components, of which those shown in the accompanying figures are merely examples that are related to the discussion herein.

FIGS. 3, 5, 8, 10 and 11 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
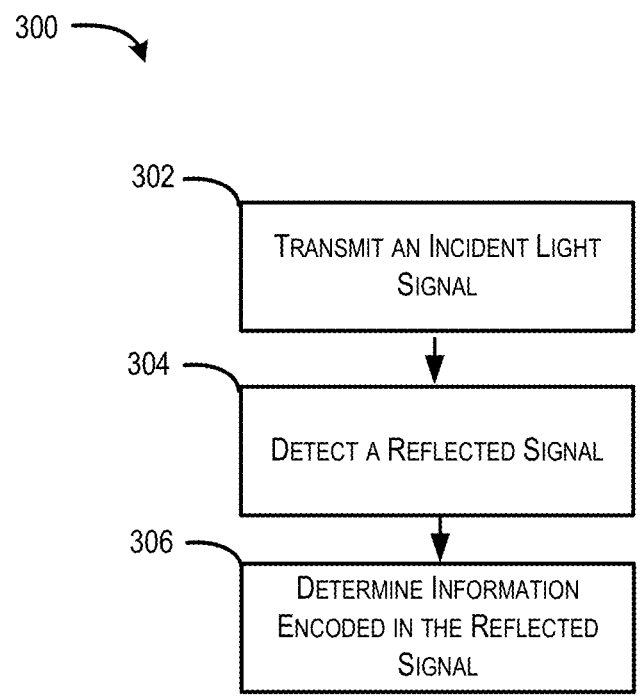
FIG. 3 is a flow diagram of an illustrative process to utilize a sensor to determine information based on a signal from an RLID structure.

FIG. 3 is a flow diagram of an illustrative process 300 to utilize a sensor to determine information based on a signal from an RLID structure. The process 300 may be implemented in the environment 100 and by the computing architecture 200 described above, or in other environments and architectures.

At 302, the light source 102 transmits an incident light signal. The light source 102 may be a laser, light-emitting diode (LED), flashlight, headlight, an ambient light source, another source that transmits light, or a combination thereof. For example, light source 102 may be a vehicle headlight that emits a beam of directed light onto the path of the vehicle. In another example, the light source 102 can be an ambient light source such as a streetlight, sunlight, or other ambient light source. The light signal 104 may include one or more of a directed light signal or a scattered light signal.

In some embodiments, the incident light signal may be a modulated signal. For example, the light source 102 may emit the incident light signal including particular characteristics such a certain frequency, a variation of frequency, a pattern of pulses, etc. In this way, modifying the characteristics of the light source 102 may encode information within the incident light signal.

The light source 102 may also operate in multiple stages, where the light source may vary the characteristics of the light signal being transmitted based on the stage in which it is operating. For example, in a first stage a light source may emit a steady beam of light so that an active RLID structure 106(A) can draw energy from the beam of light to charge a storage capacitor or battery. The light source 102 may also operate in a second stage in which the light source emits a modulated light signal having information encoded within it. By operating in two stages, the light source 102 is able to efficiently charge the active RLID structure 106(A) while also transmitting coded information.

At 304, a reflected signal from an RLID structure 106 is detected, by the sensor(s) 108. The sensor(s) 108 may detect one or more characteristics of the reflected signal. For example, the sensor may detect a frequency shift pattern, a beam spread pattern, a pulse width pattern, or a combination thereof.

At 306, the computing system 114 determines information encoded in the reflected signal. The sensor(s) 108 may detect one or more characteristics of the reflected signal. For example, the sensor may detect a frequency shift pattern, a beam spread pattern, a pulse width pattern, or a combination thereof. The computing system 114 may determine that the one or more characteristics of the reflected signal correspond to a reflective signature associated with the RLID structure 106. The computing system 114 may then access information associated with the RLID structure, the reflective signature, or both. In some embodiments, the computing system 114 may use the reflective signature to determine an identifier such as a tag, identification value, pointer value, or other unique identifier. The computing system 114 may then use the identifier to access supplemental information from a data store. For example, the computing system 114 may determine that the characteristics of a detected reflective signature correspond to a particular identification value. The computing system 114 may then access information about an object corresponding to the identification value in a data store. In another example, the computing system 114 may determine a pointer value from the characteristics of a detected reflective signature, and may use the pointer value to determine a corresponding traffic signal from a traffic lookup table.

Once the computing system 114 has accessed the information, the computing system 114 can take one or more actions. For example, where the computing system 114 is part of a toll booth and information associated with the characteristics of the reflective signature corresponds to a vehicle identification number, the computing system 114 may cause a toll charge to be levied against an account associated with the vehicle identification number.

Figure 4:
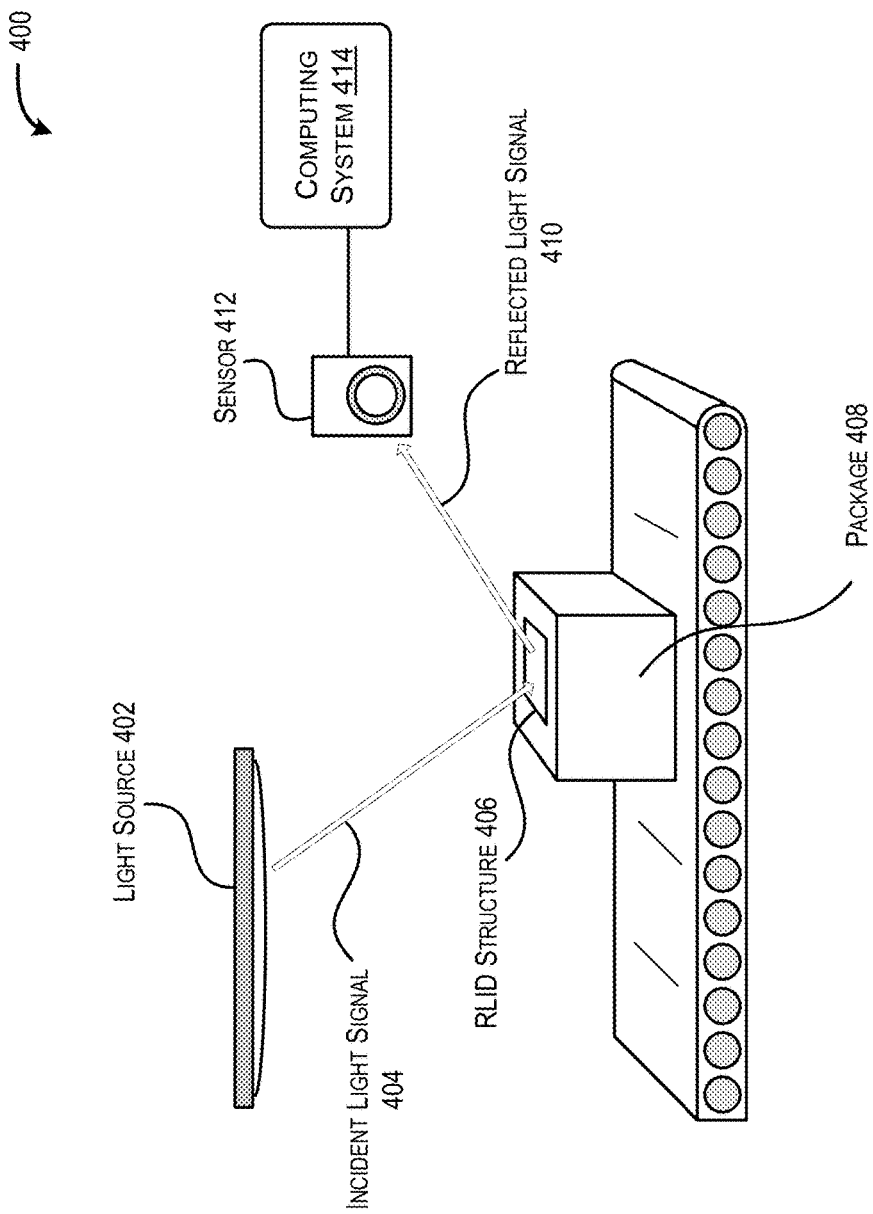
FIG. 4 is a schematic diagram where an RLID structure is used to identify items in a commerce environment.

FIG. 4 illustrates an example diagram where an RLID structure is used to identify items in a commerce environment. FIG. 4 shows an object associated with the RLID structure as a package. However, this is merely an example, and according to this application the object associated with the RLID structure may take other forms.

FIG. 4 illustrates a light source 402 emitting an incident light signal 404. FIG. 4 shows the light source 402 as a warehouse floodlight, but the light source 402 according to this application may take any form that emits directed or scattered light. For example, in an embodiment the light source 402 may include a laser configured to emit a directed beam of light. FIG. 4 shows the incident light signal 404 striking an RLID structure 406 coupled to a side of a package 408.

FIG. 4 shows the RLID structure 406 as a passive RLID structure 106(B) (i.e., does not include a power source), however in other embodiments the RLID structure 406 may include an active RLID structure 106(A) (i.e. may include a power source, battery, storage capacitor, etc.). The RLID structure 406 may be an RLID reflection surface that includes multiple layered reflective films that reflect and refract the incident light signal 404 in a way that separates the incident light signal 404 into a reflected light signal 410 that has particular characteristics, such as a frequency shift pattern, a beam spread pattern, a pulse width pattern, or a combination thereof. Because the layered reflective films reflect and refract the incident light signal 404 according to Snell's Law and Fresnel's Equations, and because the makeup of the reflective films in the RLID structure 406 is known, the reflected light signal 410 possesses a reflective signature of characteristics (e.g., frequency pattern, pulse length, pulse pattern, beam spread, etc.).

FIG. 4 shows the RLID structure 406 coupled to a surface of package 408. The RLID structure 406 may be coupled or attached to the package by adhesive means, or may be integrated as part of package 408. In some embodiments, the RLID structure 406 may be incorporated in packaging materials. For example, the RLID structure 406 may be part of a shipping label. Additionally or in the alternative, the RLID structure 406 may be integrated within packaging tape such that incident light 404 that strikes the packaging tape emits a reflected light signal that possesses a reflective signature corresponding to the RLID structure.

FIG. 4 shows sensor 412 being connected with computing system 414. The connection between the sensor 412 and computing system 414 may be a wired or wireless connection. Alternatively, the sensor 412 may be integrated as a component of the computing system 414. Sensor 412 may include one or more sensors that detect the reflected light signal 410. Sensor 412 may detect characteristics of the signal, such as frequency patterns, pulse lengths, pulse patterns, beam spreads, or a combination thereof. The computing system 414 may identify the reflective signature exhibited by the reflected light signal 410, and may use the reflective signature to identify information associated with the RLID structure 406. For example, a first reflective signature corresponding to first RLID structure incorporated in a package label may be associated with shipping information about the package 408 (e.g., destination, contents, type of shipping, handling warning, handling instructions, etc.). A second reflective signature corresponding to a second RLID structure incorporated in packing tape used on the package 408 may correspond to the same or different shipping information. Once the computing system 414 has identified information associated with the RLID structure 406, the computing system 414 can take one or more actions. In some embodiments, the one or more actions can include updating a database, sending a notification, generating handling instructions, modifying the information associated with the RLID structure 406, etc.

Figure 5:
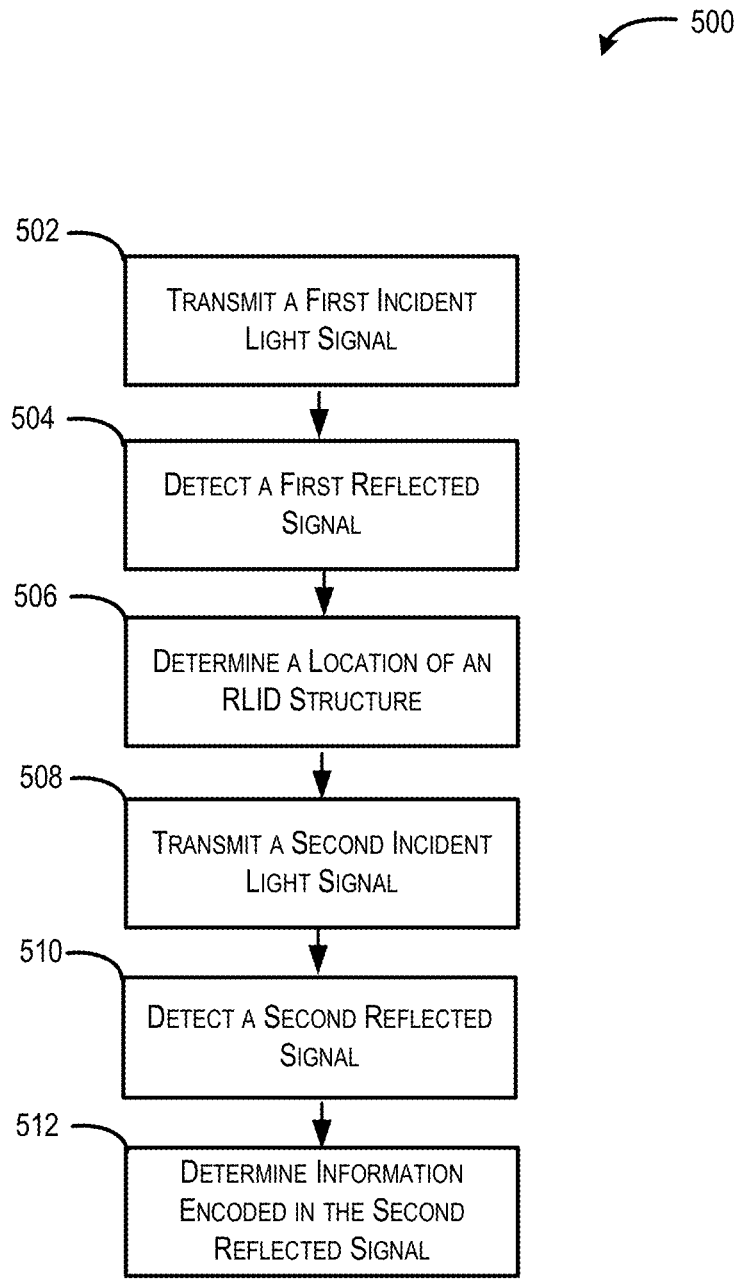
FIG. 5 is a flow diagram of an illustrative process to utilize two light signals to determine information associated with an RLID structure.

FIG. 5 is a flow diagram of an illustrative process 500 to utilize two light signals to determine information associated with an RLID structure. The process 500 may be implemented in the environment 100 and by the computing architecture 200 described above, or in other environments and architectures.

At 502, the light source 102 transmits a first incident light signal. The light source 102 may be a laser, light-emitting diode (LED), flashlight, headlight, an ambient light source, another source that transmits light, or a combination thereof. For example, light source 102 may be a vehicle headlight that emits a beam of directed light onto the path of the vehicle. The first incident light signal may include one or more of a directed light signal or a scattered light signal. In some embodiments, the first incident light signal may be a pulse (e.g., continuous pulse, pulse having a pattern of various lengths, pulse having a pattern of various intensities, pulse having a pattern of various frequencies, etc.) of scattered light that is directed towards an environment.

At 504, a first reflected signal from an RLID structure 106 is detected, by the sensor(s) 108. The sensor(s) 108 may detect one or more characteristics of the first reflected signal. For example, the sensor may detect a frequency shift pattern, a beam spread pattern, a pulse width pattern, or a combination thereof.

At 506, the computing system 114 determines a location of the RLID structure 106. For example, based on the first reflected signal, the computing system 114 may be able to identify a location as the source of the first reflected signal. The computing system 114 may also determine based on characteristics of the first reflected signal that the first reflected signal was reflected, emitted, and/or otherwise produced by an RLID structure 106. The computing system 114 may determine that the location of the source of the first reflected signal corresponds to a location of the RLID structure 106.

At 508, the light source 102 transmits a second incident light signal. The second incident light signal may include one or more of a directed light signal or a scattered light signal. In some embodiments, the second incident light signal may be a directed light signal that is directed towards the location of the RLID structure 106. In some embodiments, the second incident light signal may transmitted with one or more characteristics that encode information within the second incident light signal. For example, the light source 102 may emit the second incident light signal including particular characteristics such as a certain frequency, a variation of frequency, a pattern of pulses, etc.

At 510, a second reflected signal from an RLID structure 106 is detected, by the sensor(s) 108. The sensor(s) 108 may detect one or more characteristics of the second reflected signal. For example, the sensor may detect a frequency shift pattern, a beam spread pattern, a pulse width pattern, or a combination thereof.

At 512, the computing system 114 determines information encoded in the second reflected signal. The sensor(s) 108 may detect one or more characteristics of the second reflected signal. For example, the sensor may detect a frequency shift pattern, a beam spread pattern, a pulse width pattern, or a combination thereof. The computing system 114 may determine that the one or more characteristics of the second reflected signal correspond to a reflective signature associated with the RLID structure 106. The computing system 114 may then access information associated with the RLID structure, the reflective signature, or both. For example, the reflective signature may correspond to a traffic signal that the speed limit for a corresponding road is 65 mph.

Once the computing system 114 has accessed the information, the computing system 114 can take one or more actions. For example, where the computing system 114 is associated with a vehicle and the information associated with the reflective signature corresponds to a traffic stop signal, the computing system 114 may transmit a notification to a vehicle operation system that the vehicle is approaching a stop sign, and/or cause the vehicle to begin to initiate a stopping protocol.

Figure 6A:
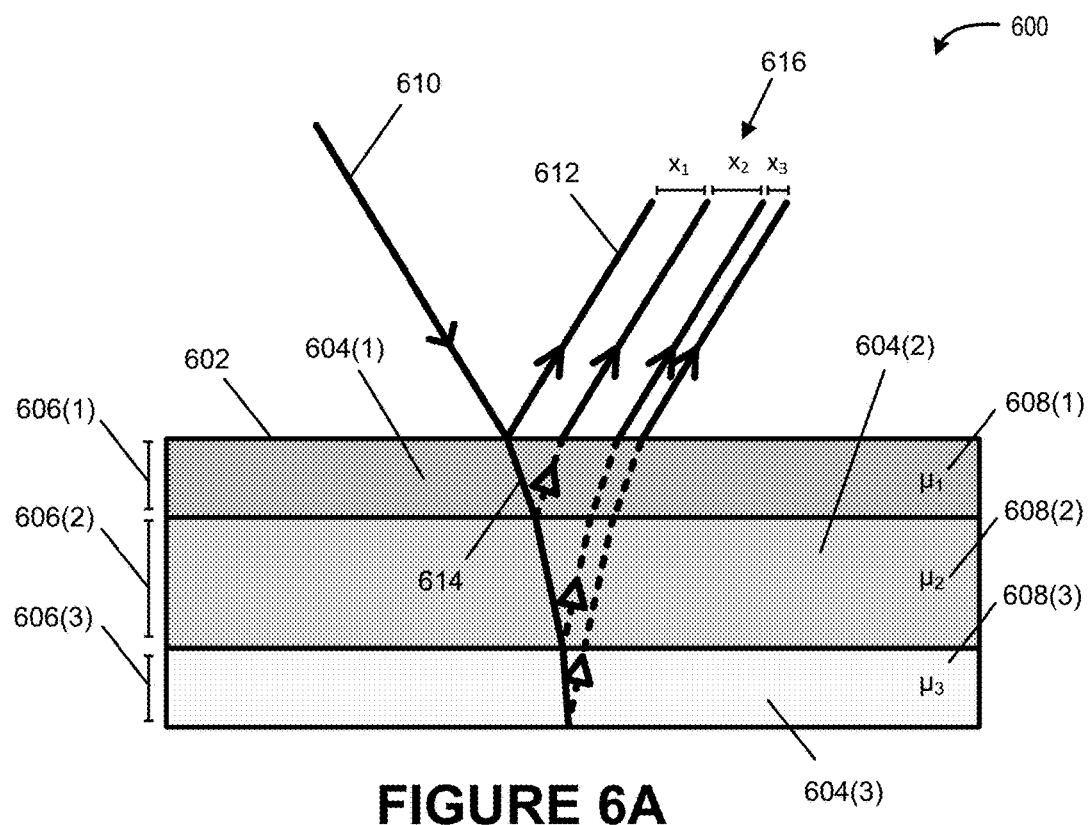
FIGS. 6A, 6B, and 6C are schematic diagrams that illustrate the operation of a passive RLID structure.
Figure 6B:
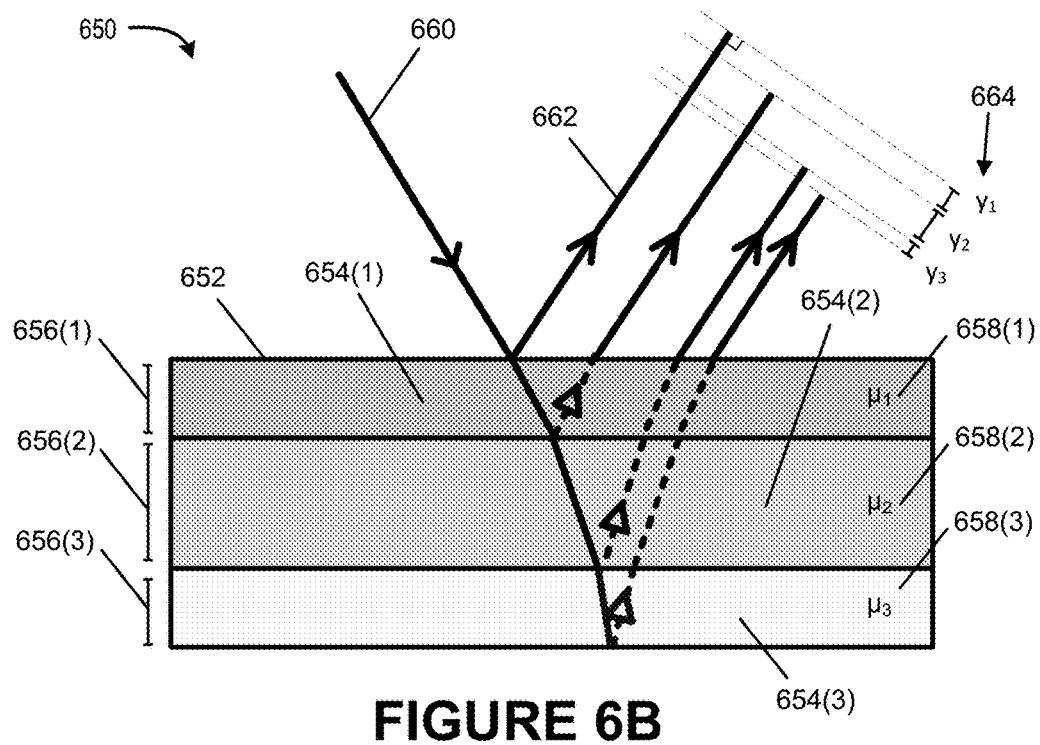
Figure 6C:
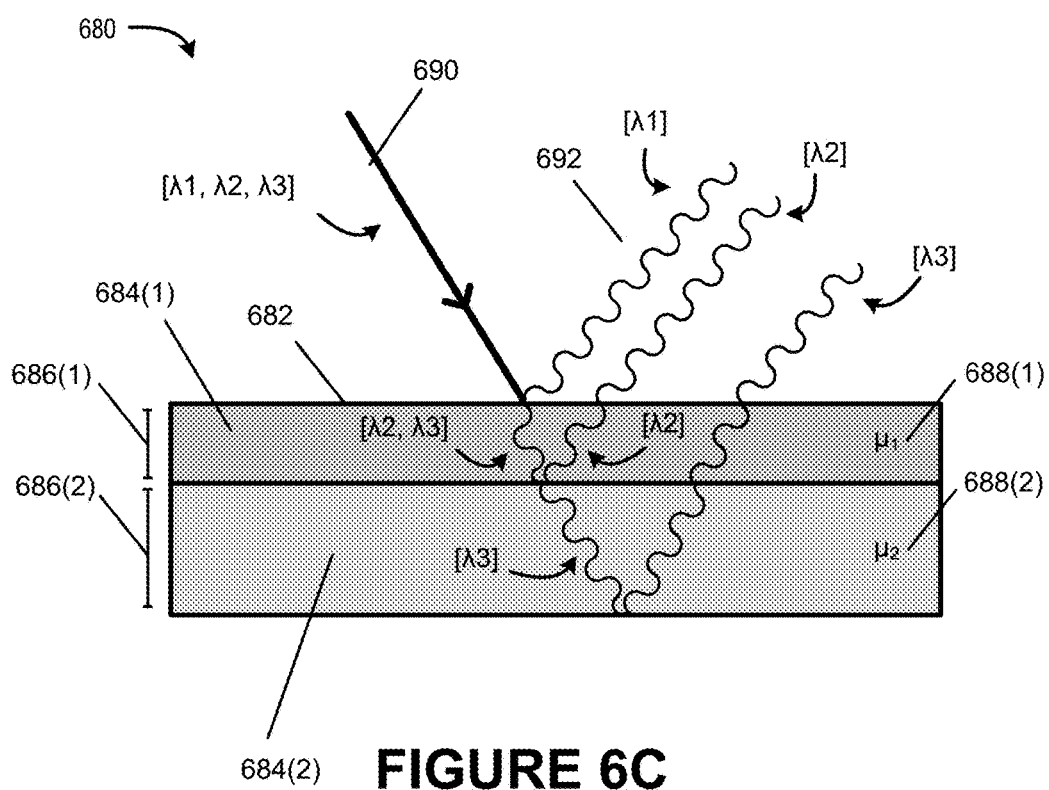

FIGS. 6A. 6B, and 6C are schematic diagrams that illustrate the operation of a passive RLID structure. FIGS. 6A, 6B, and 6C illustrate how refraction events associated with an RLID structure can create a reflected light signal having a distribution pattern and pulse pattern, respectively. However, one having ordinary skill in the art will also understand that such refraction events can also create other patterns in the reflected light, such as patterns in the frequency of the reflected light, patterns in the polarization of the reflected light, etc. Additionally, one having ordinary skill in the art will also understand that one or more elements, events, or characteristics of a reflective signature shown in any one of FIGS. 6A, 6B, and 6C may be used in combination in a single embodiment of the invention.

FIG. 6A shows an enlarged view 600 of the passive RLID structure 602 that includes reflective films 604(1), 604(2), and 604(3), that individually have the thickness 606(1), 606(2), and 606(3) and a refractive index 608(1). 608(2), and 608(3), respectively. In some embodiments, the reflective films may be made of different materials. Alternatively or in addition, some or all of the reflective films may be made of the same material. Where two successive layers are made of the same material, a reflective coating may be disposed between the layers.

FIG. 6A further shows an incident light 610 striking a surface of the RLID structure 602. At the point where incident light 610 strikes the surface of the RLID structure. FIG. 6A shows a first refraction event. At the first refraction event, a first portion of the incident light 612 is reflected, and a second portion of the incident light 614 is refracted. The amount of light that is reflected and refracted, as well as the angles at which the light is reflected and refracted is dependent upon the angle the incident light 610 strikes the surface, and the index of refraction of the medium the incident light 610 is travelling through and index of refraction 608(1) of the first reflective film 604(1).

FIG. 6A shows the second portion of the incident light 614 propagating through the first reflective film 604(1). FIG. 6A also shows a second refraction event when the second portion of the incident light 614 strikes a surface of the second reflective film 604(2). At the second refraction event, a first portion of the second portion of the incident light 614 is reflected, and a second portion of the second portion of the incident light 614 is refracted. The amount of light that is reflected and refracted, as well as the angles at which the light is reflected and refracted is dependent upon the angle the second portion of the incident light 614 strikes the surface of the second reflective film 604(2), and the index of refraction 608(1) of the first reflective film 604(1) and the index of refraction 608(2) of the second reflective film 604(2).

FIG. 6A shows similar refraction events each time a light signal intersects with a surface of a reflective film layer. FIG. 6A also shows multiple portions of light being reflected or otherwise emitted by the RLID structure 602. Due to the multiple refraction events, the individual portions of light are emitted with a particular distribution pattern 616. Because the refraction events follow Snell's Law and Fresnel's equations, the distribution pattern 616 can be predicted based on the characteristics (e.g., thickness, refractive index, etc.) of the reflective films of an RLID structure. In some embodiments, reflective layers of the RLID structure 602 may be designed (e.g., created with particular thicknesses and/or refractive indices) so that incident light 610 that is reflected by the RLID structure will exhibit a particular distribution pattern.

Additionally, reflective layers of the RLID structure 602 may be designed (e.g., created with particular thicknesses and/or refractive indices) so that the refraction events cause the different portions of light to interfere with each other. For example, the reflective layers of the RLID structure 602 may be designed so that the refraction events cause the different portions of light to negatively interfere with each other unless the incident light 610 has particular characteristics (e.g., wavelength, pulse length, pulse pattern, etc.). In this way, if the incident light 610 does not have the particular characteristics, the negative interference may reduce or eliminate the light that is reflected by RLID structure 602.

FIG. 6B shows an enlarged view 650 of the passive RLID structure 652 that includes reflective films 654(1), 654(2), and 654(3), that individually have the thickness 656(1), 656(2), and 656(3) and a refractive index 658(1), 658(2), and 658(3), respectively. In some embodiments, the reflective films may be made of different materials. Alternatively or in addition, some or all of the reflective films may be made of the same material. Where two successive layers are made of the same material, a reflective coating may be disposed between the layers.

Similar to FIG. 6A, FIG. 6B also shows incident light 660 striking a surface of the RLID structure 652, as well as multiple refraction events occurring each time a light signal intersects with a surface of a reflective film layer. FIG. 6B also shows multiple portions of light 662 being reflected or otherwise emitted by the RLID structure 652. As different portions of the reflected light 662 must travel different distances, the different portions are reflected and/or otherwise emitted by the RLID structure 652 at different times. This is illustrated in FIG. 6B as delay pattern 664. Due to delay pattern 664, a sensor that detects the reflected light 662 may detect the individual pulses corresponding to portions of the reflected light 662.

Because the refraction events follow Snell's Law and Fresnel's equations, the delay pattern 664 (and thus the pulse pattern detected by the sensor) can be predicted based on the characteristics (e.g., thickness, refractive index, etc.) of the reflective films of an RLID structure. In some embodiments, reflective layers of the RLID structure 652 may be designed (e.g., created with particular thicknesses and/or refractive indices) so that incident light 660 that is reflected by the RLID structure will exhibit a particular pulse pattern.

FIG. 6C shows an enlarged view 680 of the passive RLID structure 682 that includes reflective films 684(1) and 684 (2), that individually have a thickness 686(1) and 686(2), and a refractive index 688(1) and 688(2), respectively. In some embodiments, the reflective films may be made of different materials. Alternatively or in addition, some or all of the reflective films may be made of the same material with a reflective coating disposed between the layers.

Similar to FIG. 6A, FIG. 6C also shows incident light 690 striking a surface of the RLID structure 682, as well as multiple refraction events occurring each time a light signal intersects with a surface of a reflective film layer. Incident light 690 may contain light having different wavelengths. For example, in FIG. 6C incident light 690 contains portions of light having a set of wavelengths ($\lambda 1$, $\lambda 2$, and $\lambda 3$). In different embodiments, incident light 690 may contain any combination of one or more wavelengths.

FIG. 6C shows a first refraction event occurring when incident light 690 strikes the upper surface of reflective film 684(1). In some embodiments, individual reflective films may reflect or refract light of one or more wavelengths. For example, a particular reflective film may reflect light having wavelengths corresponding to the color red and the color green. That is, during a refraction event, a first portion of light having wavelengths corresponding to red and/or green will be reflected by the particular reflective film, and a second portion of light having wavelengths that do not correspond to red or green are refracted by the particular reflective film. In other embodiments, the reflective film may reflect light having wavelengths corresponding to one or more other colors, one or more ranges of wavelengths, etc.

FIG. 6C shows that the first refraction event includes light having a wavelength $\lambda 1$ being reflected, and light having wavelengths λ2 and λ3 being refracted. FIG. 6C also shows a second refraction event occurring when the portion of light refracted by the first refraction event strikes the upper surface of reflective film 684(2). FIG. 6C shows that the second refraction event includes light having a wavelength λ2 being reflected, and light having wavelength λ3 being refracted.

FIG. 6C also shows multiple portions of light 692 being reflected or otherwise emitted by the RLID structure 682. Because different refraction events shown in FIG. 6C reflect light having different wavelengths, the multiple portions of light 692 will have a refraction pattern that includes a pattern of colors. This is illustrated in FIG. 6C as the multiple portions of light including a reflected portion of blue light, a reflected portion of yellow light, and a reflected portion of red light. A sensor that detects the reflected light 692 may detect the individual portions of light, and may determine the corresponding colors of the portions of the reflected light, a delay between pulses of different colors, a spread between pulses of different colors, etc. In some embodiments, reflective layers of the RLID structure 682 may be designed (e.g., created with particular thicknesses and/or refractive indices) so that incident light 690 that is reflected by the RLID structure will exhibit a particular color pattern.

Figure 7A:
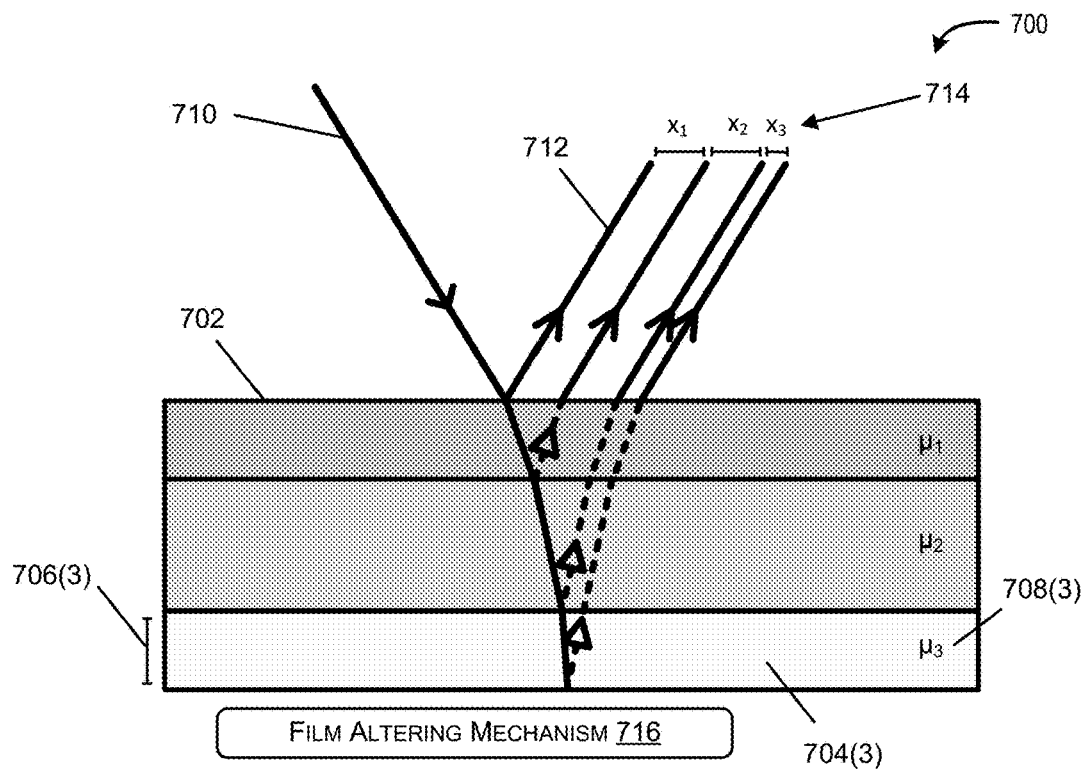
FIGS. 7A and 7B are schematic diagrams that illustrate the operation of a passive RLID structure having variable films.
Figure 7B:
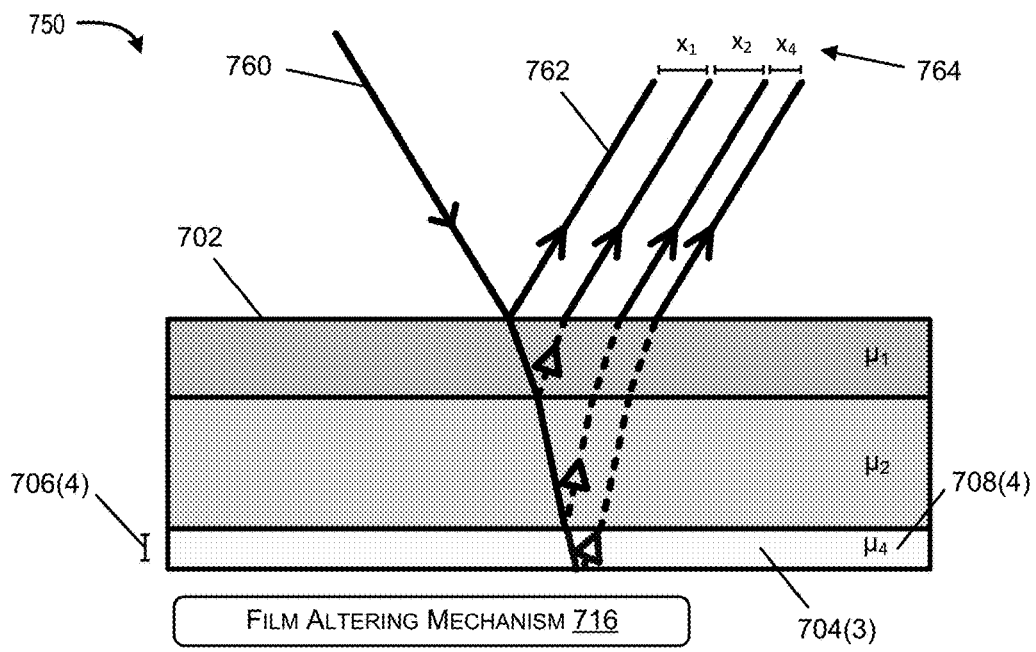

FIGS. 7A and 7B are schematic diagrams that illustrate the operation of a passive RLID structure having variable films. FIGS. 7A and 7B illustrate how varying the thickness of a reflective film in an RLID structure can cause a variation in the reflection signature exhibited by the light reflected by the RLID structure. However, one having ordinary skill in the art will also understand that the variation of other characteristics of a reflective film (e.g., varying the refractive index of the reflective film, etc.) may also result in a variation of the reflective signature exhibited by the light reflected by the RLID structure.

Additionally, FIGS. 7A and 7B illustrate how varying the characteristics of a variable reflection layer can change distribution of light reflected by the RLID structure 702. However, one having ordinary skill in the art will also understand that such characteristic variation can also change other aspects of the reflective signature of the RLID structure 702 such as the pulse pattern, pulse length, frequency pattern, polarization pattern, etc.

FIG. 7A shows an enlarged view 700 of the passive RLID structure 702 that includes a variable reflective film 704(3) that has a first thickness 706(3) and a first refractive index 708(3) when in a first state. Similar to FIGS. 6A and 6B, FIG. 7A also shows incident light 710 striking a surface of the RLID structure 702, as well as multiple refraction events occurring each time a light signal intersects with a surface of a reflective film layer. FIG. 7A also shows multiple portions of light 712 being reflected or otherwise emitted by the RLID structure 702. Due to the multiple refraction events, the individual portions of light 712 are emitted with a particular reflective signature 714.

FIG. 7A also shows a film altering mechanism 716 that is configured to modify one or more characteristics of one or more variable reflective layers of RLID structure 702. In some embodiments, the film altering mechanism may be a heating element that changes the temperature of one or more variable reflective films of the RLID structure 702. In some embodiments, as the temperature of the reflective films changes, one or more characteristics (e.g., the thickness, refractive index, etc.) of individual variable reflective films may change. In another example, the film altering mechanism may include a capacitor, and may be positioned such that one or more characteristics (e.g., the thickness, refractive index, etc.) of individual variable reflective films may change as the charge of the capacitor is varied.

FIG. 7B shows an enlarged view 750 of the passive RLID structure 702 that includes a variable reflective film 704(3) that has a second thickness 706(4) and a second refractive index 708(4) when in a second state. Similar to FIG. 7A, FIG. 7B also shows incident light 760 striking a surface of the RLID structure 702, as well as multiple refraction events occurring each time a light signal intersects with a surface of a reflective film layer. FIG. 7B also shows multiple portions of light 762 being reflected or otherwise emitted by the RLID structure 702. Due to the multiple refraction events, the individual portions of light 762 are emitted with reflective signature 764. FIG. 7A also shows a film altering mechanism 716 that is configured to modify one or more characteristics of one or more variable reflective layers of RLID structure 702.

Because the refraction events follow Snell's Law and Fresnel's equations, the change in characteristics of variable reflective film 704(3) causes reflective signature 764 to be different from reflective signature 714 shown in FIG. 7A. Moreover, as the refraction events follow Snell's Law and Fresnel's equations, the film altering mechanism 716 may change the characteristics of variable reflective film 704(3) so that light that is reflected by the RLID structure will exhibit a particular reflective signature.

For example, where RLID structure 702 is associated with a stoplight, and the film altering mechanism 716 includes a capacitor, the film altering mechanism 716 may vary the charge on the capacitor based on the current signal of the traffic light. For example, for a traffic signal of "STOP," the capacitor may store a first amount of charge, causing one or more variable reflective films to have a first set of characteristics. This causes the RLID structure 702 to reflect light having a first reflective signature. For a traffic signal of "GO," the capacitor may store a second amount of charge, causing the one or more variable reflective films to have a second set of characteristics. This causes the RLID structure 702 to reflect light having a second reflective signature. In this way, the film altering mechanism 716 may cause the RLID structure 702 to reflect light having a different reflection signature at different times.

Additionally, in some embodiments the one or more variable reflective films may change their characteristics based on environmental conditions. For example, the characteristics of an individual reflective film may change based on one or more of environmental temperature, pressure, moisture content, etc. In such embodiments, the RLID structure may not include the film altering mechanism 716.

Figure 8:
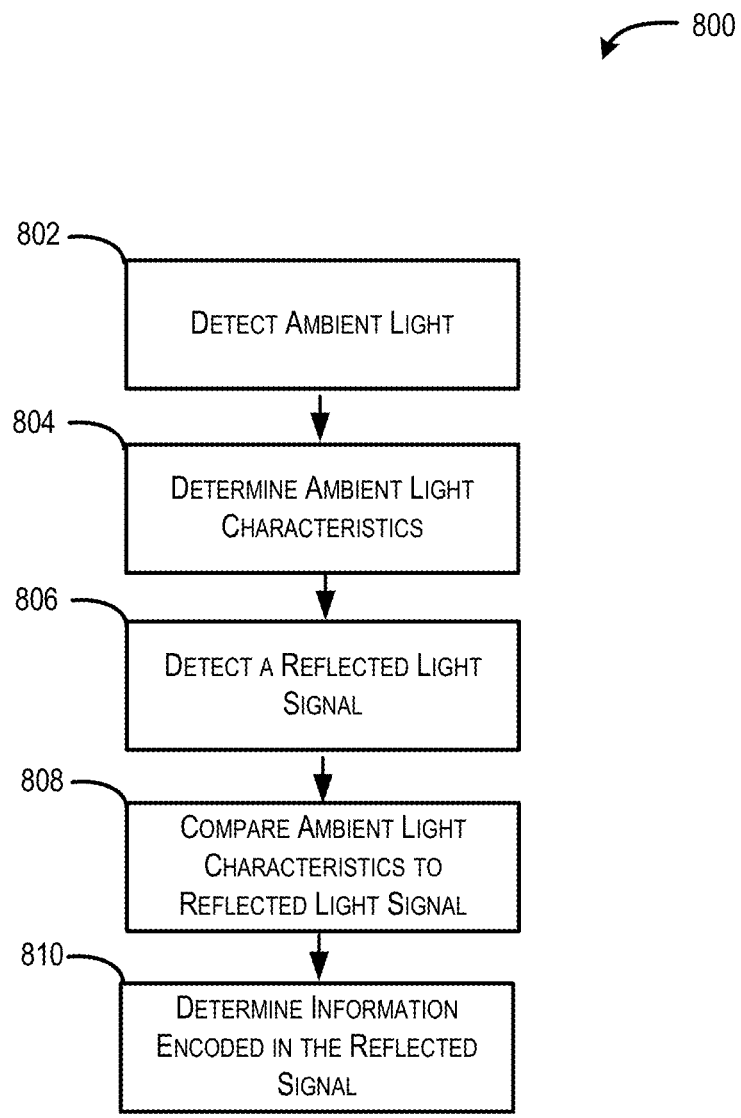
FIG. 8 is a flow diagram of an illustrative process 800 to utilize ambient light to determine information associated with an RLID structure.

FIG. 8 is a flow diagram of an illustrative process 800 to utilize ambient light to determine information associated with an RLID structure. The process 800 may be implemented in the environment 100 and by the computing architecture 200 described above, or in other environments and architectures.

At 802, ambient light is detected by sensor 108. The sensor(s) 108 may detect one or more characteristics of the ambient light. Ambient light may include light occurring within the environment of the RLID structure or incident light that is emitted by a light transmitting source. For example, the sensor may detect a frequency shift pattern, a beam spread pattern, a pulse width pattern, or a combination thereof.

At 804, the computing device 114 determines a first set of characteristics of the ambient light. For example, where sensor 108 is located in a shipping warehouse, the computing device 114 may determine the characteristics that is exhibited by the ambient lighting within the shipping warehouse. As conditions within the environment change, the computing device 114 may periodically re-determine the first set of characteristics to reflect current ambient light conditions.

At 806, a reflected signal is detected, by the sensor(s) 108. The sensor(s) 108 may detect one or more characteristics of the reflected signal. For example, the sensor may detect a frequency shift pattern, a beam spread pattern, a pulse width pattern, or a combination thereof.

At 808, the computing device 114 compares the ambient light characteristics to the reflected light signal. For example, the computing device 114 may determine a second set of characteristics of the reflected signal, and compare the first set of characteristics to the second set of characteristics. By detecting a difference between the two sets of characteristics, the computing system 114 may determine that the reflected light originated from an RLID structure 106. The computing system 114 may also determine a reflective signature of the reflected light signal based on the comparison. For example, the reflective signature may include a frequency shift pattern, a beam spread pattern, a pulse width pattern, or a combination thereof.

At 810, the computing system 114 determines information encoded in the reflected signal. For example, the computing system 114 may access information associated with the RLID structure, the reflective signature, or both. Once the computing system 114 has accessed the information, the computing system 114 can take one or more actions. For example, where the computing system 114 is associated with a vehicle and the information associated with the reflective signature corresponds to a traffic stop signal, the computing system 114 may transmit a notification to a vehicle operation system that the vehicle is approaching a stop sign, and/or cause the vehicle to begin to initiate a stopping protocol.

Figure 9A:
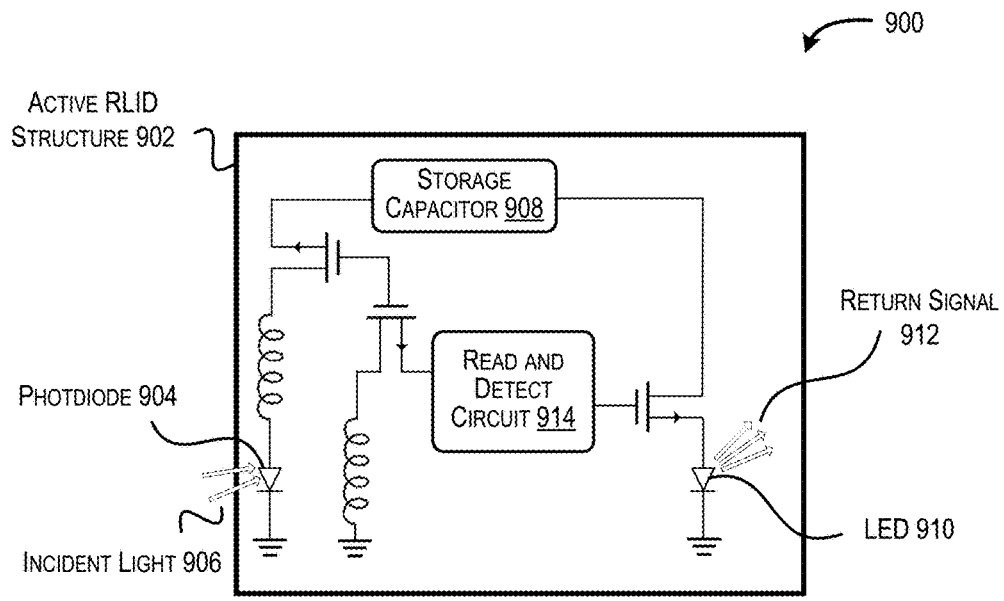
FIGS. 9A and 9B are schematic diagrams that illustrate the operation of an active RLID structure.
Figure 9B:
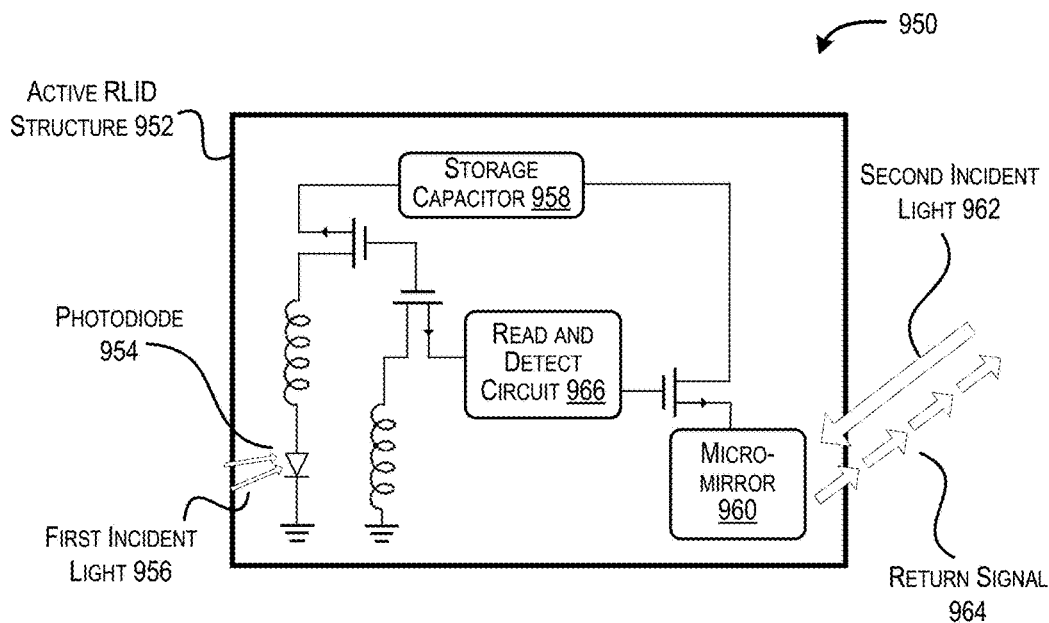

FIGS. 9A and 9B are schematic diagrams that illustrate the operation of an active RLID structure. FIGS. 9A and 9B illustrate how an active RLID structure can create a signal with a LED and micro mirror, respectively. However, one having ordinary skill in the art will also understand that the active RLID structure may create the signal with other means (e.g., an audible signal from a speaker).

FIG. 9A shows an enlarged view 900 of active RLID structure 902. Active RLID structure 902 may include a photodiode 904 that harvests energy from an incident light signal 906. For example, the photodiode may harvest energy when operating in a photovoltaic mode with zero bias. In other embodiments, the active RLID structure 902 may include an alternative means of harvesting energy from incident light. The active RLID structure 902 may use the harvested energy to charge a storage capacitor 908, a battery, or a combination thereof. The active RLID structure 902 may also include an LED 910. In some embodiments, the active RLID structure 902 may use the energy stored in storage capacitor 908 to cause LED 910 to emit a return signal 912. In some embodiments, the return signal 912 may include an encoded piece of data (i.e., exhibits particular characteristics such as frequency, pulse length, pulse pattern, etc.).

In some embodiments, the active RLID structure 902 may include a read and detect circuit 914 that is configured to trigger the active RLID structure 902 to transmit return signal 912 in response to a determination that incident light signal 906 exhibits a particular characteristic. For example, the read and detect circuit 914 may only trigger the active RLID structure 902 to transmit return signal 912 when incoming light signal 906 exhibits a particular pulse pattern.

FIG. 9B shows an enlarged view 950 of active RLID structure 952. Active RLID structure 952 may include a photodiode 954 that harvests energy from a first incident light signal 956. In other embodiments, the active RLID structure 952 may include an alternative means of harvesting energy from incident light. The active RLID structure 952 may use the harvested energy to charge a storage capacitor 958, a battery, or a combination thereof. The active RLID structure 952 may also include a micro-mirror 960. In some embodiments, the active RLID structure 952 may use the energy stored in storage capacitor 958 to actuate the micro-mirror 960. In some embodiments, actuating the micro-mirror 960 may include causing the micro-mirror 960 to switch between two or more positions. In this way, a second incident light 962 may be periodically reflected to create return signal 964. In some embodiments, by vibrating the micro-mirror 960 in a particular pattern, the return signal 964 may include an encoded piece of data (i.e., exhibits particular characteristics such as pulse length, pulse pattern, etc.).

In some embodiments, the active RLID structure 952 may include a read and detect circuit 966 that is configured to trigger the active RLID structure 952 to transmit return signal 964 in response to a determination that incident light signal 956 exhibits a particular characteristic. For example, the photodiode 954 may be used to register and decode a set of bits/bytes serially encoded in the incident light signal 956. The sequence of bits (at a specified rate) produces a photovoltaic signal that varies over time. The read and detect circuit 966 may only trigger the active RLID structure 952 to transmit return signal 964 when a specific pattern of the signal is observed.

Figure 10:
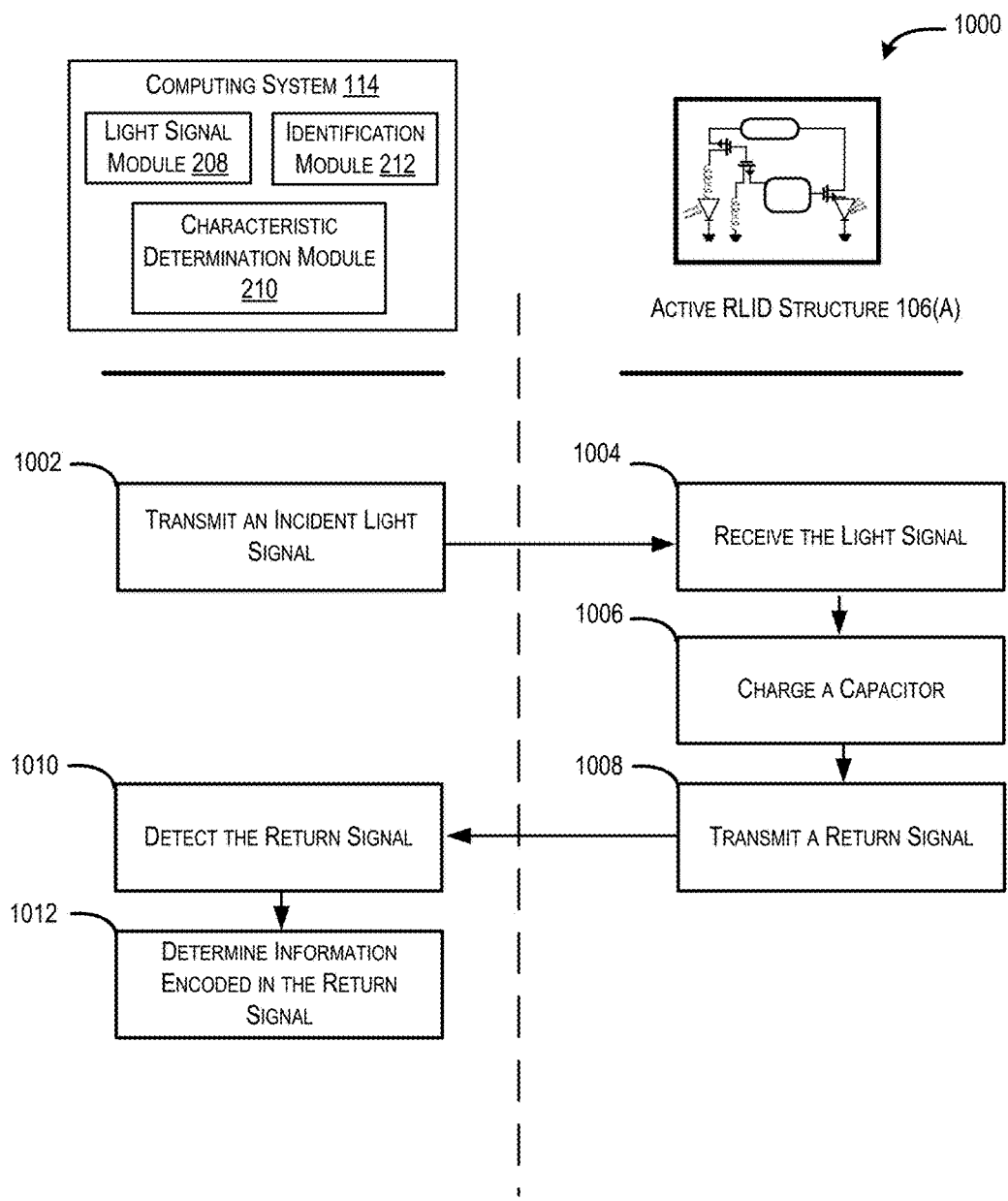
FIG. 10 is a flow diagram of an illustrative process to utilize light signals to determine information associated with an active RLID structure.

FIG. 10 is a flow diagram of an illustrative process 1000 to utilize light signals to determine information associated with an active RLID structure. The process 1000 may be implemented in the environment 100 and by the computing architecture 200 described above, or in other environments and architectures.

At 1002, the light source 102 transmits an incident light signal. The light source 102 may be a laser, light-emitting diode (LED), flashlight, headlight, an ambient light source, another source that transmits light, or a combination thereof. For example, light source 102 may be a marine searchlight that emits a beam of light over the water.

At 1004, the active RLID structure 106(A) receives the light signal. In some embodiments, the active RLID structure 106(A) may receive the light signal via a photodiode. In other embodiments, the active RLID structure 106(A) may include an alternative means of harvesting energy from incident light.

At 1006, the active RLID structure 106(A) charges a capacitor. In other embodiments, the active RLID structure 106(A) may use the harvested energy to charge a battery, or another energy-storing device.

At 1008, the active RLID structure 106(A) transmits a return signal. In some embodiments, the active RLID structure 106(A) may use the energy stored in storage capacitor to cause an LED to emit the return signal. In other embodiments, the active RLID structure may use the energy stored in storage capacitor to actuate the micro-mirror to reflect a portion of the incident light to create the return signal. In some embodiments, the return signal may include an encoded piece of data (i.e., exhibits particular characteristics such as frequency, pulse length, pulse pattern, etc.). For example, by vibrating the micro-mirror in a particular pattern, the return signal may include an encoded piece of data (i.e., exhibits particular characteristics such as pulse length, pulse pattern, etc.).

At 1010, the return signal is detected by sensor(s) 108. The sensor(s) 108 may detect one or more characteristics of the return signal. For example, the sensor may detect a pulse pattern, a pulse width pattern, etc.

At 1012, the computing system 114 determines information encoded in the return signal. The sensor(s) 108 may detect one or more characteristics of the return. For example, the sensor may detect a pulse width pattern exhibited by the return signal. The computing system 114 may determine that the one or more characteristics of the return signal correspond to a reflective signature associated with the active RLID structure 106(A). The computing system 114 may then access information associated with the active RLID structure 106(A), the reflective signature, or both. For example, where the active RLID structure 106(A) is located on the side of a shipping vessel, the reflective signature may correspond to a ship identification number associated with a vessel.

Figure 11:
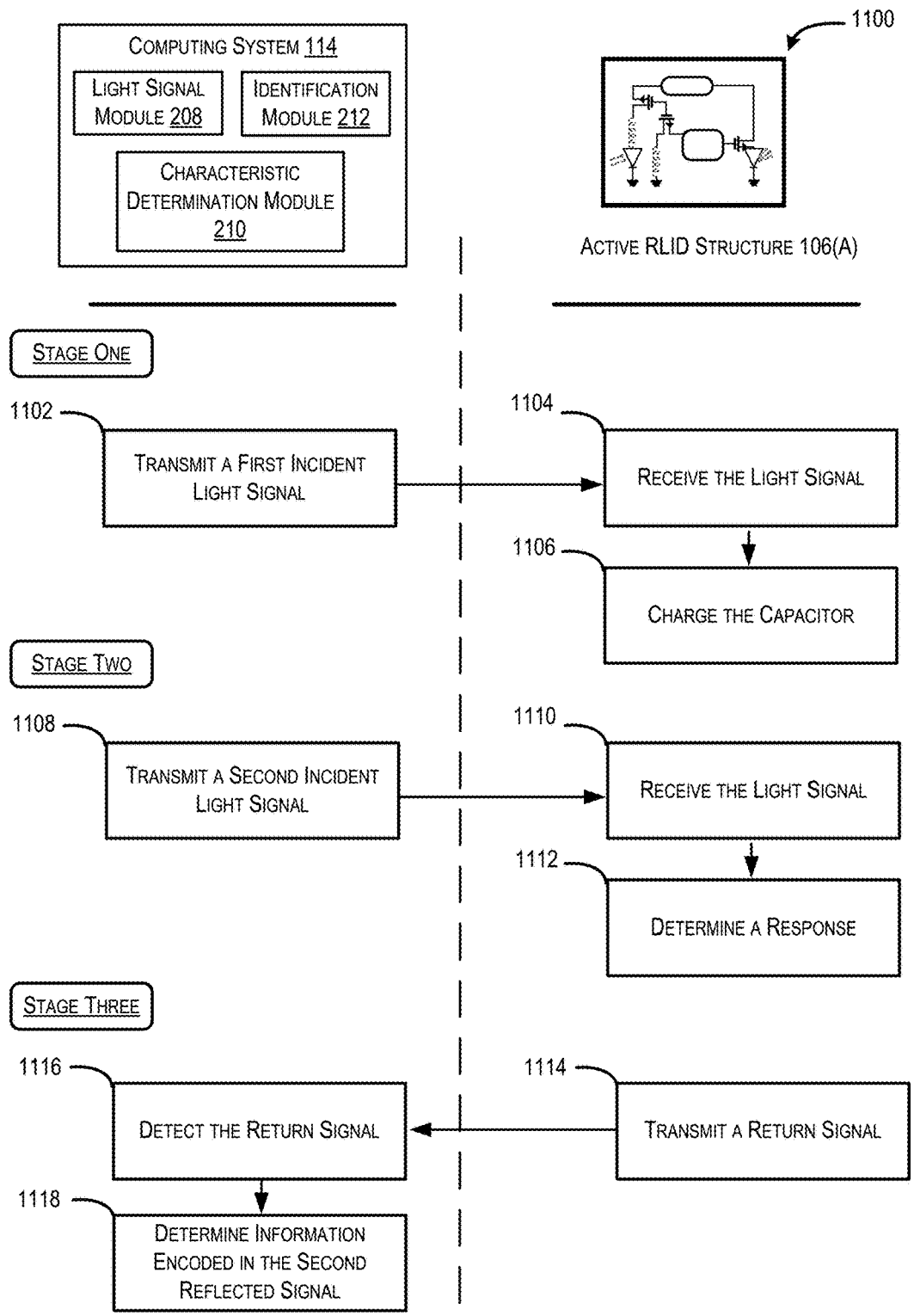
FIG. 11 is a flow diagram of an illustrative process to utilize multiple incident light signals to determine information associated with an active RLID structure.

FIG. 11 is a flow diagram of an illustrative process 1100 to utilize multiple incident light signals to determine information associated with an active RLID structure. The process 1100 may be implemented in the environment 100 and by the computing architecture 200 described above, or in other environments and architectures.

FIG. 11 shows three stages within the process 1100. Stage one includes process steps 1102-1106, stage two includes process steps 1108-1112, and stage three includes process steps 1114-1118. In different embodiments, the stages may occur in different order. Additionally, in some embodiments one or more of the stages may not be included in process 1100.

At 1102, the light source 102 transmits a first incident light signal. The light source 102 may be a laser, light-emitting diode (LED), flashlight, headlight, an ambient light source, another source that transmits light, or a combination thereof. For example, light source 102 may be a marine searchlight that emits a beam of light over the water.

At 1104, the active RLID structure 106(A) receives the light signal. In some embodiments, the active RLID structure 106(A) may receive the light signal via a photodiode. In other embodiments, the active RLID structure 106(A) may include an alternative means of harvesting energy from incident light.

At 1106, the active RLID structure 106(A) charges a capacitor. In other embodiments, the active RLID structure 106(A) may use the harvested energy to charge a battery, or another energy-storing device.

At 1108, the light source 102 transmits a second incident light signal. In some embodiments, the second incident light signal may include information encoded within characteristics of the signal. For example, the second incident light signal may exhibit a particular pattern of pulses.

At 1110, the active RLID structure 106(A) receives the light signal. In some embodiments, the active RLID structure 106(A) may receive the light signal via a photodiode. In other embodiments, the active RLID structure 106(A) may include an alternative means of harvesting energy from incident light.

At 1112, the active RLID structure 106(A) determines a response to the light signal. For example, in some embodiments the active RLID structure 106(A) may include a read and detect circuit that is configured to determine the characteristics of the light signal. For example, the read and detect circuit may identify the particular pattern of pulses exhibited by the second incident light signal. The active RLID structure 106(A) may then determine whether to trigger a return signal. For example, a read and detect signal in the RLID structure 106(A) may be configured to only trigger a response when an incident light signal exhibits one or more preset characteristics.

The active RLID structure 106(A) may also determine characteristics of the return signal that the RLID structure 106(A) is to transmit. For example, based on the characteristics of the incident signal, a read and detect signal in the RLID structure 106(A) may be configured determine an appropriate set of characteristics that the return signal is to exhibit. For example, based on the incident light exhibiting characteristics associated with a request for temperature information, the read and detect circuit may determine that the return signal is to exhibit characteristics associated with a temperature of the RLID structure 106(A) (or an associated object).

At 1114, the active RLID structure 106(A) transmits a return signal. In some embodiments, the active RLID structure 106(A) may use the energy stored in storage capacitor to cause an LED to emit the return signal. In other embodiments, the active RLID structure may use the energy stored in storage capacitor to actuate the micro-mirror to reflect a portion of the incident light to create the return signal. In some embodiments, the return signal may include an encoded piece of data (i.e., exhibits particular characteristics such as frequency, pulse length, pulse pattern, etc.). For example, by vibrating the micro-mirror in a particular pattern, the return signal may include an encoded piece of data (i.e., exhibits particular characteristics such as pulse length, pulse pattern, etc.).

At 1116, the return signal is detected by sensor(s) 108. The sensor(s) 108 may detect one or more characteristics of the return signal. For example, the sensor may detect a pulse pattern, a pulse width pattern, etc.

At 1118, the computing system 114 determines information encoded in the return signal. The sensor(s) 108 may detect one or more characteristics of the return signal. For example, the sensor may detect a pulse width pattern exhibited by the return signal. The computing system 114 may determine that the one or more characteristics of the return signal correspond to a reflective signature associated with the active RLID structure 106(A). The computing system 114 may then access information associated with the active RLID structure 106(A), the reflective signature, or both. For example, where the active RLID structure 106(A) is located on the side of a shipping vessel, the reflective signature may correspond to a ship identification number associated with a vessel.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A reflected light identification (RLID) system comprising:
an RLID structure comprising:
a first reflective film having a first side and a second side; and a second reflective film having a third side, the first reflective film being positioned so that the second side of the first reflective film is positioned adjacent to the third side of the second reflective film, and wherein the RLID structure is configured to encode information into a reflected light signal, the information being encoded via at least:

a first refraction event that occurs when incident light strikes the first side of the first reflective film, and a second refraction event that occurs when a portion of the incident light that is refracted by the first refraction event strikes a portion of the RLID structure where the second side of the first reflective film is adjacent to the third side of the second reflective film;

a sensor;

one or more processors; and memory storing computer-executable instructions that, when executed on the one or more processors, cause the RLID system to perform acts comprising:

detecting, by the sensor, the reflected light signal from the RLID structure;

determining, by the one or more processors, one or more reflected light characteristics of the reflected light signal; and determining, by the one or more processors and based at least in part on the one or more reflected light characteristics, the information encoded in the reflected signal.

2. The RLID system as recited in claim 1, wherein the acts further comprise:

detecting, by the sensor, ambient light;

determining, by the one or more processors, one or more ambient characteristics of the ambient light; and wherein determining the one or more reflected light characteristics comprises comparing the one or more ambient characteristics to the reflected light signal.

3. The RLID system as recited in claim 1, wherein the RLID structure further comprises a capacitor, and wherein at least one of a thickness or a refractive index of at least one of the first reflective film or the second reflective film is configured to vary based at least in part on a charge stored on the capacitor.

4. The RLID system as recited in claim 1, further comprising a light source configured to transmit an incident light signal, wherein the incident light signal comprises one or more pulses of light, and the acts further comprising:

transmitting, by the light source, the one or more pulses of light of the incident light signal to the RLID structure; and wherein the reflected light signal from the RLID structure is based at least in part on the incident light signal.

5. A method comprising:

detecting, by a sensor, a first portion of a reflected light signal having one or more first characteristics from a reflected light identification (RLID) structure, wherein the one or more first characteristics are based at least in part on a first refraction event that occurs as a result of incident light striking a first surface of the RLID structure;

detecting, by the sensor, a second portion of the reflected light signal having one or more second characteristics from the RLID structure, wherein the one or more second characteristics are based at least in part on a second refraction event that occurs as a result of a portion of the incident light striking a second surface of the RLID structure;

determining, by one or more processors and based at least in part on the one or more first characteristics and the one or more second characteristics, one or more third characteristics of the reflected light signal;

determining, by the one or more processors and based at least in part on the one or more third characteristics of the reflected light signal, a unique identifier; and accessing, using the unique identifier, additional information from an information store.

6. The method as recited in claim 5, further comprising:

transmitting, by a light source, one or more pulses of incident light to the RLID structure; and wherein the reflected light signal from the RLID structure is based at least in part on the one or more pulses of incident light.

7. The method as recited in claim 6, wherein the reflected light signal is a second reflected light signal, and the method further comprises:

transmitting, by the light source, a diffuse light signal;

detecting, by the sensor, a first reflected light signal from the RLID structure;

determining, by the one or more processors and based on the first reflected light signal, a location of the RLID structure; and wherein transmitting the one or more pulses of incident light is based at least in part on the location.

8. The method as recited in claim 5, further comprising:

detecting, by the sensor, ambient light;

determining, by the one or more processors, one or more ambient characteristics of the ambient light; and wherein determining the one or more first characteristics of the first portion of the reflected light signal comprises comparing the one or more ambient characteristics to the first portion of the reflected light signal.

9. The method as recited in claim 5, wherein the RLID structure comprises at least:

a first reflective film layer having a first side and a second side; and a second reflective film layer having a third side, the first reflective film layer being positioned so that the second side of the first reflective film layer is positioned adjacent to the third side of the second reflective film layer.

10. The method as recited in claim 9, wherein:

the first surface of the RLID structure comprises the first side of the first reflective film layer, the portion of the incident light that strikes the second surface of the RLID structure comprises the portion of the incident light that is refracted as a result of the first refraction event, and the second surface of the RLID structure comprises a location of the RLID structure where the second side of the first reflective film layer is adjacent to the third side of the second reflective film layer.

11. The method as recited in claim 9, wherein the RLID structure is configured to vary at least one of a thickness or a refractive index of at least one of the first reflective film layer or the second reflective film layer based on one or more environmental conditions, the additional information includes at least a first environmental condition, and the method further comprising determining that the first environmental condition corresponds to a current environment associated with the RLID structure.

12. The method as recited in claim 5, wherein the one or more third characteristics comprise one or more of: a polarization pattern, a frequency pattern, a pulse length pattern, a pulse spacing pattern, or a beam spread pattern.

13. A reflected light identification (RLID) system comprising:
- a sensor:
- one or more processors; and
- memory storing computer-executable instructions that, when executed on the one or more processors, cause RLID system to perform acts comprising:
  - detecting, by the sensor, a first portion of a reflected light signal from an RLID structure;
  - detecting, by the sensor, a second portion of the reflected light signal from the RLID structure;
  - determining, by the one or more processors and based at least in part on the first portion of the reflected light signal, one or more first reflected light characteristics of the reflected light signal, wherein the one or more first reflected light characteristics are based at least in part on a first refraction event that occurs as a result of incident light striking a first surface of the RLID structure;
  - determining, by the one or more processors and based at least in part on the second portion of the reflected light signal, one or more second reflected light characteristics of the reflected light signal, wherein the one or more second reflected light characteristics are based at least in part on a second refraction event that occurs as a result of a portion of the incident light striking a second surface of the RLID structure;
  - determining, by the one or more processors and based at least in part on the one or more reflected light characteristics of the reflected light signal, a unique identifier; and
  - accessing, using the unique identifier, additional information from an information store.

14. The RLID system as recited in claim 13, wherein the RLID structure comprises at least:
- a first reflective film layer having a first side and a second side; and
- a second reflective film layer having a third side, the first reflective film layer being positioned so that the second side of the first reflective film layer is positioned adjacent to the third side of the second reflective film layer.

15. The RLID system as recited in claim 13, wherein the additional information includes one or more environmental conditions, and the acts further comprise determining, by the one or more processors, that the one or more environmental conditions correspond to an environment associated with the RLID structure.

16. The RLID system as recited in claim 13, wherein the additional information includes an identification number for an object, and the acts further comprise determining, by the one or more processors, that the RLID structure is associated with the object.

17. The RLID system as recited in claim 13, further comprising a light source, and the acts further comprising:
- transmitting, by the light source, an incident light signal to the RLID structure; and
- wherein the reflected light signal from the RLID structure is based at least in part on the incident light signal.

18. The RLID system as recited in claim 17, wherein the reflected light signal is a second reflected light signal, and the acts further comprise:
- transmitting, by the light source, a diffuse light signal;
- detecting, by the sensor, a first reflected light signal from the RLID structure;
- determining, by the one or more processors and based on the first reflected light signal, a location of the RLID structure; and
- wherein transmitting the incident light signal is based at least in part on the location.

19. The RLID system as recited in claim 17, wherein the incident light signal is a first incident light signal, the reflected light signal is a first reflected light signal, the additional information is first additional information, and the acts further comprising:
- transmitting, by the light source, a second incident light signal to the RLID structure;
- detecting, by the sensor, a second reflected light signal from the RLID structure;
- determining, by one or more processors, one or more third reflected light characteristics of the second reflected light signal; and
- determining, by the one or more processors and based at least in part on the one or more third reflected light characteristics, second additional information encoded in the second reflected signal, the second additional information being different from the first additional information.

20. The RLID system as recited in claim 19, wherein the first incident light signal is a first set of one or more pulses having a first pulse pattern, the second incident light signal is a second set of one or more pulses having a second pulse pattern, and wherein the first additional information is different from the second additional information based at least in part on the first pulse pattern being different from the second pulse pattern.

* * * * *